United States Patent [19]

Kera et al.

[11] 4,049,957
[45] Sept. 20, 1977

[54] DUAL COMPUTER SYSTEM

[75] Inventors: Kazuo Kera; Yutaka Kubo; Hirokazu Ihara, all of Hitachi, Japan

[73] Assignee: Hitachi, Ltd., Japan

[21] Appl. No.: 597,174

[22] Filed: July 18, 1975

Related U.S. Application Data

[63] Continuation-in-part of Ser. No. 512,971, Oct. 7, 1974, abandoned, which is a continuation of Ser. No. 395,012, Sept. 7, 1973, abandoned, which is a continuation-in-part of Ser. No. 264,509, June 20, 1972, abandoned.

[30] Foreign Application Priority Data

June 23, 1971  Japan .................................. 46-44796

[51] Int. Cl.$^2$ ............................................. G06F 11/00
[52] U.S. Cl. ...................... 235/153 AK; 235/153 AE
[58] Field of Search ................. 235/153 AK, 153 AE; 340/172.5

[56] References Cited

U.S. PATENT DOCUMENTS

| | | | |
|---|---|---|---|
| 3,252,149 | 5/1966 | Weida et al. | 235/153 AE |
| 3,303,474 | 2/1967 | Moore et al. | 340/172.5 |
| 3,517,174 | 6/1970 | Ossfeldt | 235/153 AE |
| 3,557,315 | 1/1971 | Kobus et al. | 235/153 AK |
| 3,692,989 | 9/1972 | Kandiew | 235/153 AK |
| 3,806,887 | 4/1974 | Schulte et al. | 340/172.5 |
| 3,838,261 | 9/1974 | Rice et al. | 235/153 AE |
| 3,898,621 | 8/1975 | Zelinski et al. | 340/172.5 |

*Primary Examiner*—Charles E. Atkinson
*Attorney, Agent, or Firm*—Craig & Antonelli

[57] ABSTRACT

A dual computer system comprising a pair of computer systems and a dual system controller for monitoring the results of the operations by the computer systems. When the results of the operations coincide with each other, such results are applied to an external output register for process control, while when there is non-coincidence between the results of the operations the operation of the computer systems is interrupted and both the computer systems are checked with a diagnose routine for detection as to whether the operation is normal or abnormal. In the system, a status register is provided so that the computer systems can read the content of the register before being placed in independent operation. The main and subsidiary computer systems read the content of the register with different timing so that they may not arbitrarily deliver their outputs to the external output register due to malfunctions of the dual system controller.

6 Claims, 12 Drawing Figures

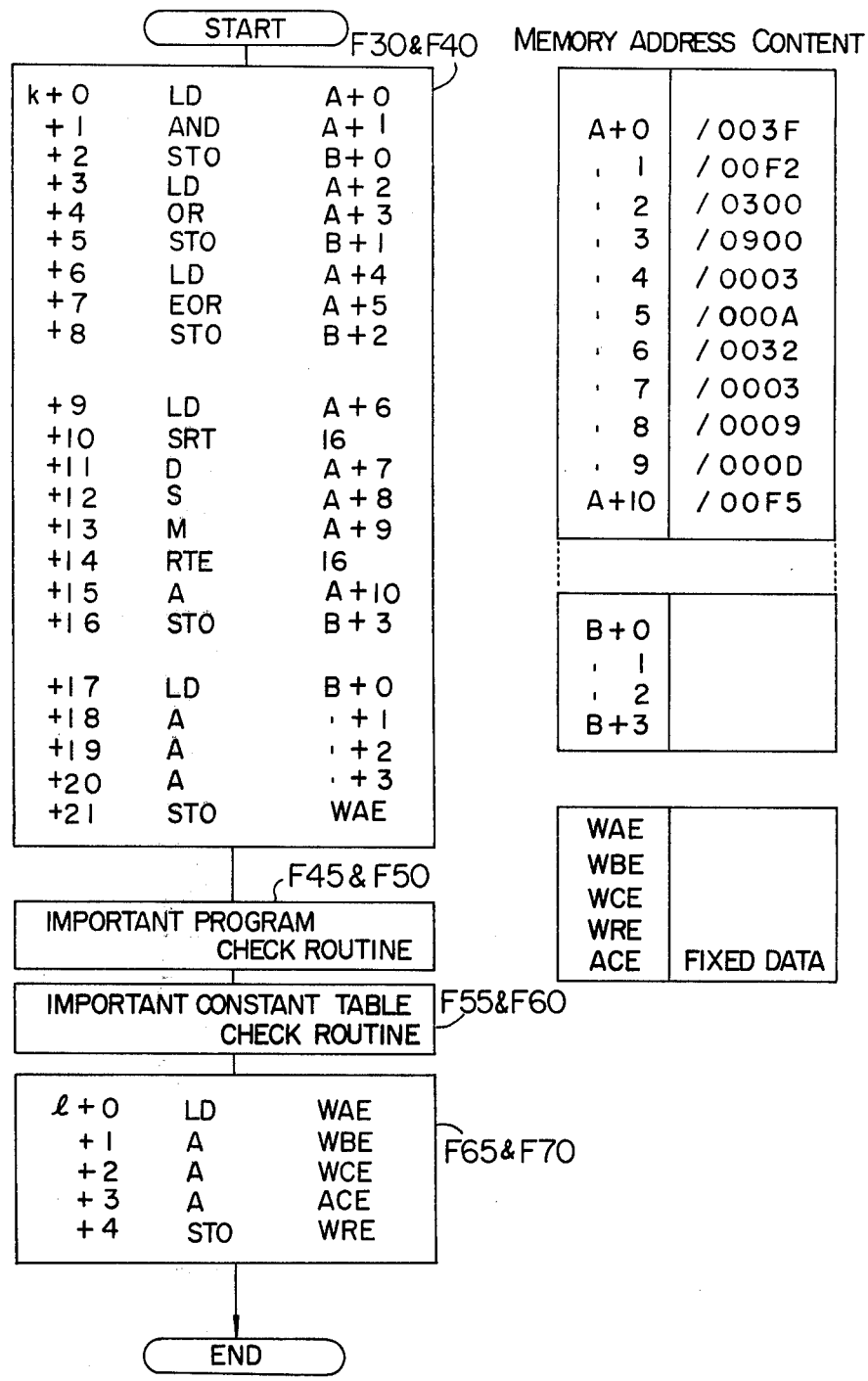

FIG. 11

| MEMORY ADDRESS | DATA |
|---|---|
| WE | CONTROL OUTPUT DATA |
| WIE | INTERRUPTION SOURCE |
| WAE | RESULT OF RUN OF MACHINE LANGUAGE CHECK ROUTINE |
| WBE | RESULT OF RUN OF IMPORTANT PROGRM CHECK ROUTINE |
| WCE | RESULT OF RUN OF IMPORTANT CONSTANT TABLE CHECK ROUTINE |
| ACE | CORRECTION VALUE FOR RESULT OF RUN OF DIAGNOSE ROUTINE |
| WRE | RESULT OF RUN OF DIAGNOSE ROUTINE |
| WJE | DATA INDICATING DELIVERY OF RESULT OF RUN OF DIAGNOSE ROUTINE TO DSC 3 |
| WKE | CONTENT OF STATUS REGISTER 5 |

DUAL COMPUTER SYSTEM

CROSS-REFERENCES TO RELATED APPLICATION

This application is a continuation-in-part application of our copending application, Ser. No. 521971, filed on Oct. 7, 1974, (now abandoned) which in turn is a continuation application of our copending application, Ser. No. 395012, filed on Sept. 7, 1973 (now abandoned), which in turn is a continuation-in-part application of our copending application, Ser. No. 264509 filed on June 20, 1972 (now abandoned).

BACKGROUND OF THE INVENTION

1. Field of the Invention

This invention relates to a dual computer system including a pair of computer systems for carrying out the same operation, a dual system controller for monitoring the results of the operations, by the computer systems and applying the results of the operations to an external output register upon confirmation of coincidence between the results of the operations, and means for running a diagnose routine through the computer systems when there is non-coincidence between the results the operations or when an abnormal condition occurs in the dual system controller, so that the dual computer system can be placed in one of a plurality of operating modes including parallel operation of the computer systems with the first system working as the main system, parallel operation of the computer systems with the second system working as the main system, independent operation of the first computer system, and independent operation of the second computer system.

2. Description of the Prior Art

Conventional dual computer systems having a dual system controller therein have been based on thee premise that the dual system controller can continuously operate trouble-free. Thus, the conventional systems have been placed in a very dangerous state when the dual system controller fails to properly operate due to trouble occurring therein. The malfunction of the dual system controller leads to a situation such that it detects non-coincidence between the data outputs of the first and second computer systems in spite of the fact that these two computer systems are delivering the same and correct output data. In such a case, the dual system controller detecting the non-coincidence between the data outputs applies an interruption request signal to these computer systems. In response to the application of the interruption request signal, a diagnose routine is run through these two computer systems for checking as to whether the output data are correct or not. In this case, the result of checking with this routine proves that these two computer systems are delivering the same and correct output data, and each individual computer system judges that its own system is accurately operating and cuts itself from the other system to directly apply its output data to an external output register. This is a very dangerous state for the dual computer system of this kind.

SUMMARY OF THE INVENTION

It is a primary object of the present invention to provide an improved dual computer system which is free from various problems encountered with conventional systems of this kind due to failure of proper operation of the dual system controller.

Another object of the present invention is to provide a dual computer system in which means are provided so that the two computer systems may not simultaneously cut themselves from each other for independent operation.

A further object of the present invention is to provide a reliable dual computer system in which the operating mode of each individual computer system can be switched over quite smoothly.

Another object of the present invention is to provide a dual computer system in which the operating mode of one of the computer systems can be switched over while suitably correlating it with the operating mode of the other computer system.

According to one feature of the present invention, the dual computer system includes a status register which registers the operating mode of the individual computer systems so that the content of the register can be referred to prior to the switchover of the operating mode of the computer systems.

According to another feature of the present invention, one of the computer systems reads the content of the status register with timing different from that with which the other system reads such content depending on whether the specific computer system is the main or subsidiary system.

According to a further feature of the present invention, the operating mode of one of the computer systems is changed over to independent operation on the condition that, the other computer system is not placed in independent operation.

Other objects, features and advantages of the present invention will be apparent from the following description taken in conjunction with the accompanying drawing.

BRIEF DESCRIPTION OF THE DRAWING

FIG. 10a is a flow chart illustrating one practical form of a diagnose routine to be run through the computers.

FIG. 10b shows memory means employed for the diagnose routine shown in FIG. 10a.

FIG. 11 shows memory areas and data stored in the memory areas in the computers.

DESCRIPTION OF THE PREFERRED EMBODIMENT

Figure 1:
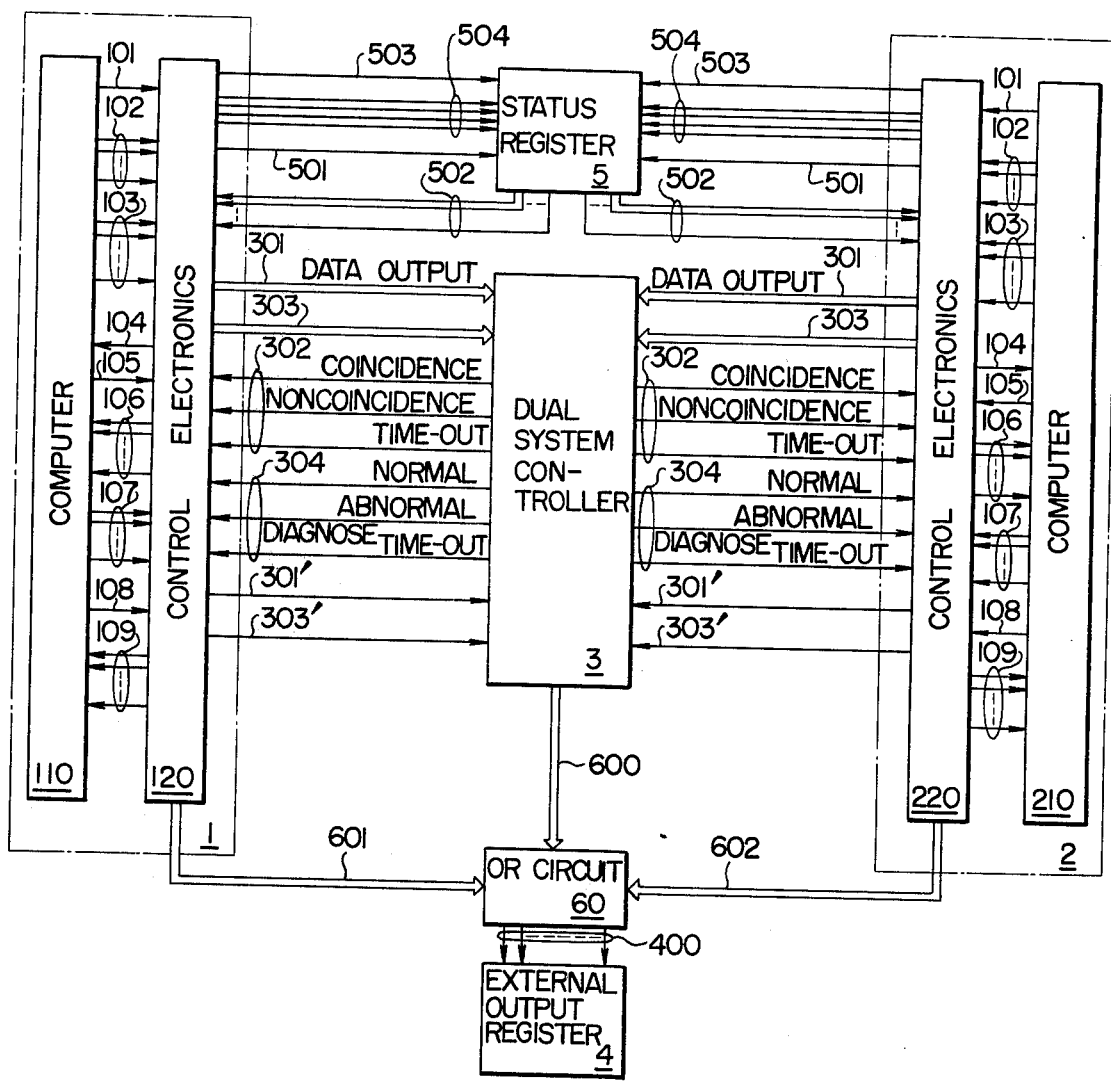
FIG. 1 is a block diagram of an embodiment of the dual computer system according to the present invention.

Referring to FIG. 1 showing an embodiment of the present invention in block diagram, a dual computer system comprises a pair of computer systems 1 and 2. These computer systems 1 and 2 are respectively composed of computers 110, 210 and control electronics 120, 220. These computers are, for example, those sold under the trade name "HITAC 7250" by Hitachi, Ltd. (a Japanese corporation) or those sold under the trade name "IBM 1800" by International Business Machine Corporation (an American corporation). However, any other suitable computers may be employed.

Control data used for the control of, for example, an industrial process are computed in the computer systems 1 and 2 and are applied to a dual system controller 3 which functions to permit delivery of these data to the exterior only when the data inputs coincide with each other. An external output register 4 stores temporarily the control data therein for the application of the control data for controlling the industrial process. A status register 5 displays or registers the present operation mode of the dual computer system. The output 600 of the dual system controller 3 and outputs 601 and 602 of the respective computer systems 1 and 2 are applied to an OR circuit 60 which is connected to the external output register 4.

Figure 2:
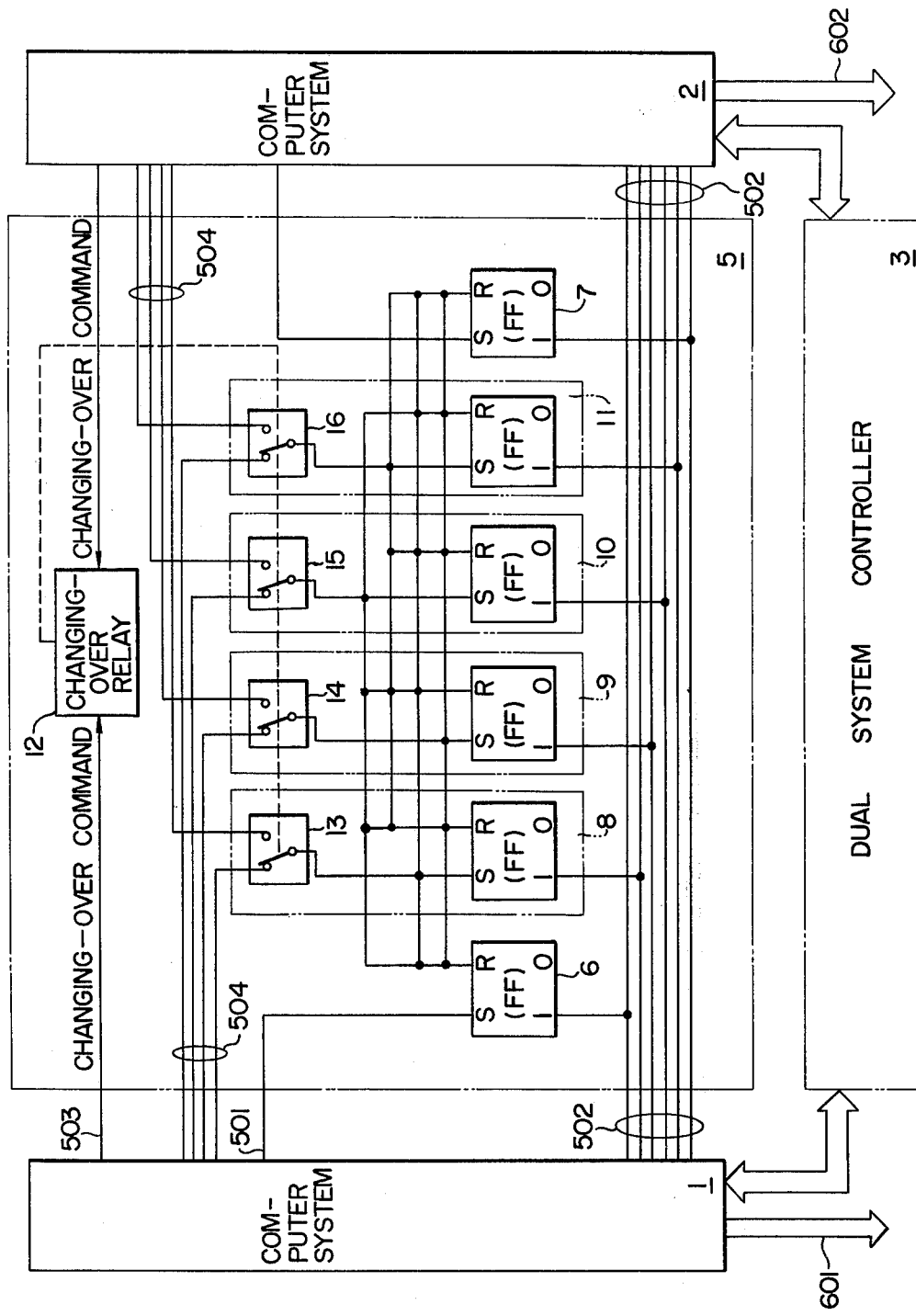
FIG. 2 shows in detail the structure of the status register 5 shown in FIG. 1.

FIGS. 2 to 5 show in detail the structure of the blocks shown in FIG. 1. FIG. 2 shows in detail the structure of the status register 5. Referring to FIG. 2, the status register 5 comprises a plurality of registers 6 to 11, a plurality of changing-over switches 13 to 16, and a changing-over relay 12. The changing-over relay 12 is energized by a changing-over command 503 applied from the computer systems 1 and 2 to actuate the changing-over switches 13 to 16. The registers 6 and 7 display the shut-down mode of the respective computer systems 1 and 2 in response to the application of a shut-down signal 501 from the associated computer system. The register 8 displays the dual operation mode of the computer systems 1 and 2 with the computer system 1 operating as the main system. The register 9 displays the dual operation mode of the computer systems 1 and 2 with the computer system 2 operating as the main system. The register 10 displays the independent operation mode of the computer system 1, and the register 11 displays the independent operation mode of the computer system 2.

Figure 3:
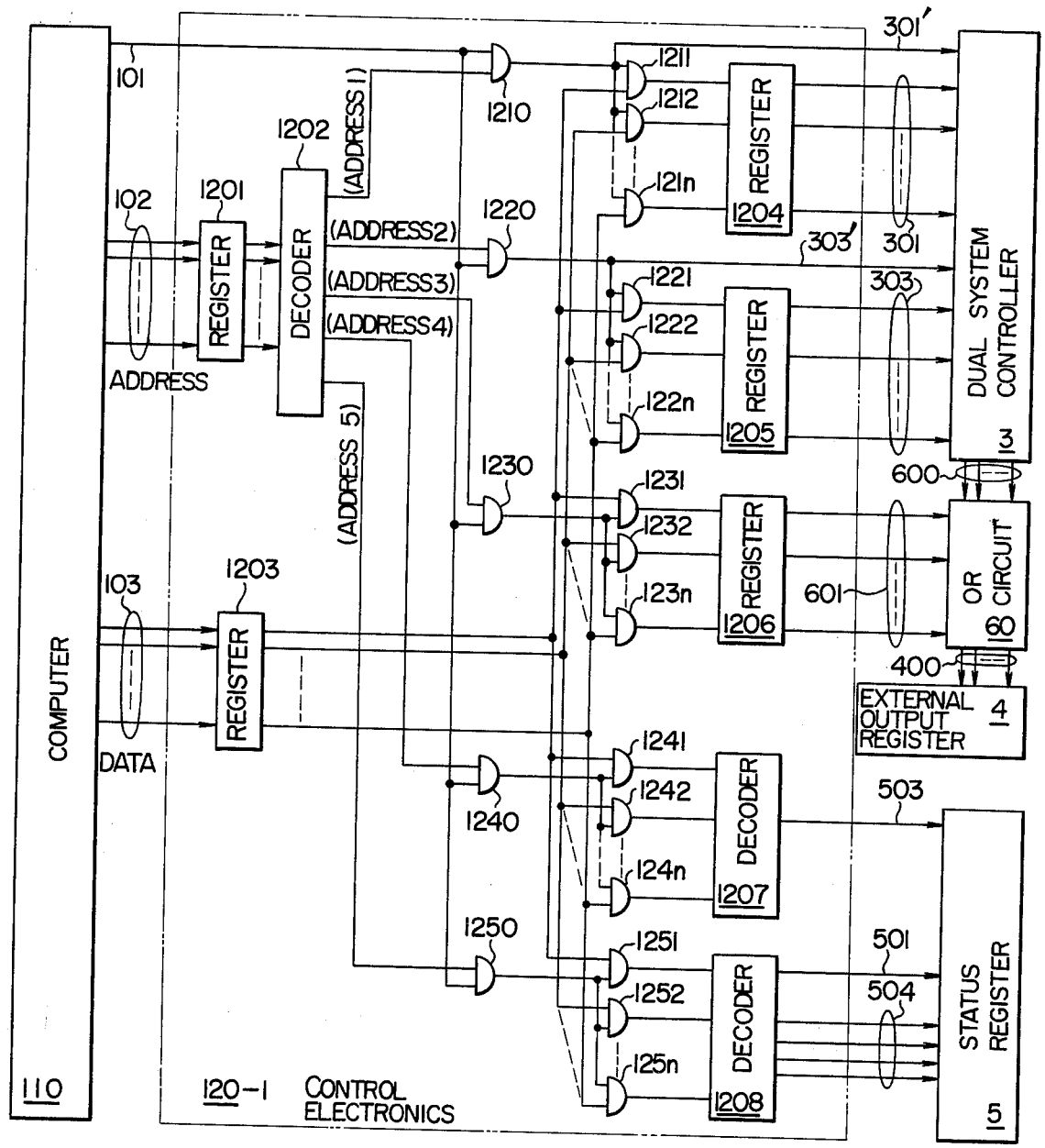
FIGS. 3 and 4 show in detail various internal circuits of the control electronics 120 shown in FIG. 1 for applying and receiving various signals to and from the computer 110, dual system controller 3, status register 5 and OR circuit 60.

FIG. 3 shows various internal circuits of the control electronics 120 through which various signals are applied from the computer 110. The other control electonics 220 has entirely the same structure as that of the control electronics 120, and thus, any detailed description of the structure thereof is unnecessary. Referring to FIG. 3, a register 1201 registers an address signal 102 applied from the computer 110, another register 1203 registers a data signal 103 applied from the computer 110, and an address decoder 1202 determines the address dictated by the address signal 102 registered in the register 1201. The address decoder 1202 applies an output signal to one of a plurality of AND gates 1210, 1220, . . . 1250 corresponding to one of the addresses 1 to 5 dictated by the address signal 102. A timing signal 101 is applied to these AND gates 1210, 1220, . . . 1250 so that an output signal appears from the AND gate to which the output signal of the address decoder 1202 is applied. The content of the register 1203 appears from AND gates 1211 to 121n when an output signal appears from the AND gate 1210. The content of the register 1203 appears fromm AND gates 1211 to 122n when an output signal appears from the AND gate 1220. The content of the register 1203 appears from AND gates 1231 to 123n when an output signal appears from the AND gate 1230. The content of the register 1203 appears from AND gates 1241 to 124n when an output signal appears from the AND gate 1240. Similarly, the content of the register 1203 appears from AND gates 1251 to 125n when an output signal appears from the AND gate 1250.

The outputs of the AND gates 1211 to 121n are applied to a register 1204 which applies a control data signal 301 to the dual system controller 3 for comparison with similar data signal 301 as described later. The outputs of the AND gates 1221 to 122n are applied to another register 1205 which applies to the dual system controller 3 a signal 303 which is indicative of the result of checking with a diagonose routine as described later. The outputs of the AND gates 1231 to 123n are applied to another register 1206 which applies a control data output signal 601 to the OR circuit 60. The outputs of the AND gates 1241 to 124n are applied to a decoder 1207 which applies a changing-over command 503 to the status register 5. The outputs of the AND gates 1251 to 125n are applied to another decoder 1208 which applies a shut-down signal 501 and a status signal 504 to the status register 5.

Figure 4:
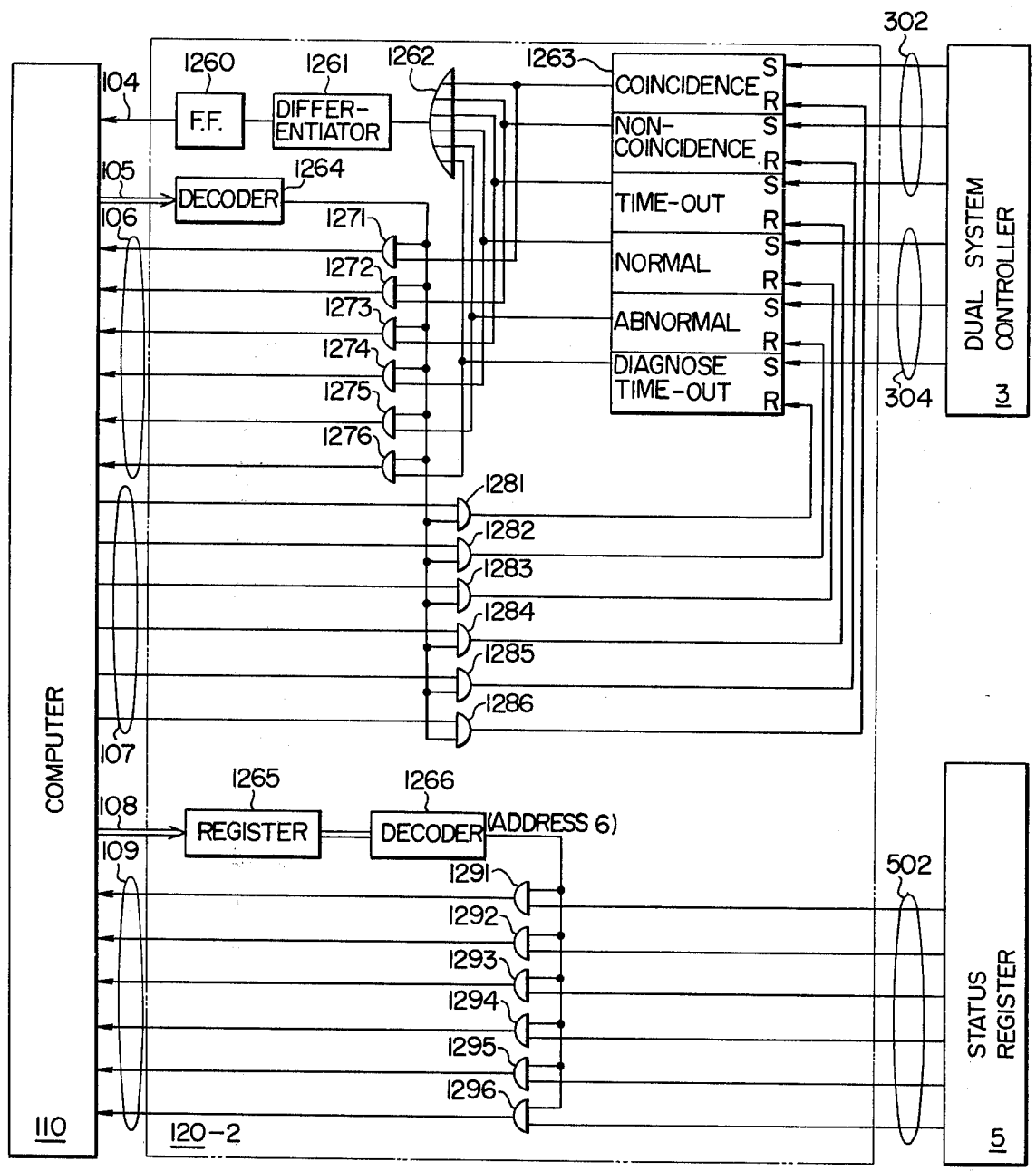

FIG. 4 shows various internal circuits of the control electronics 120 through which various signals are applied to the computer 110. FIG. 4 shows also circuits for applying an interruption request signal 104 to the computer 110 and receiving an interruption source identifying signal 105 from the computer 110. Referring to FIG. 4, a differentiator 1261 is connected to the output terminal of an OR gate 1262 to apply a set pulse and a reset pulse to a flip-flop 1260. A register 1263 consists of six flip-flops which are connected to the respective input terminals of the OR gate 1262. The signal 105 is applied from the computer 110 to a decoder 1264 which applies selectively a gate signal to one of a group of AND gates 1271 to 1276 and to one of another group of AND gates 1281 to 1286. A register 1265 registers another address signal 108 applied from the computer 110. The content of the register 1265 is applied to a decoder 1266 which applies selectively a gate signal to one of another group of AND gates 1291 to 1296. In FIG. 4, the gates and gate signals concerned directly with the operation of the dual computer system according to the present invention are merely shown to avoid confusion.

Figure 5:
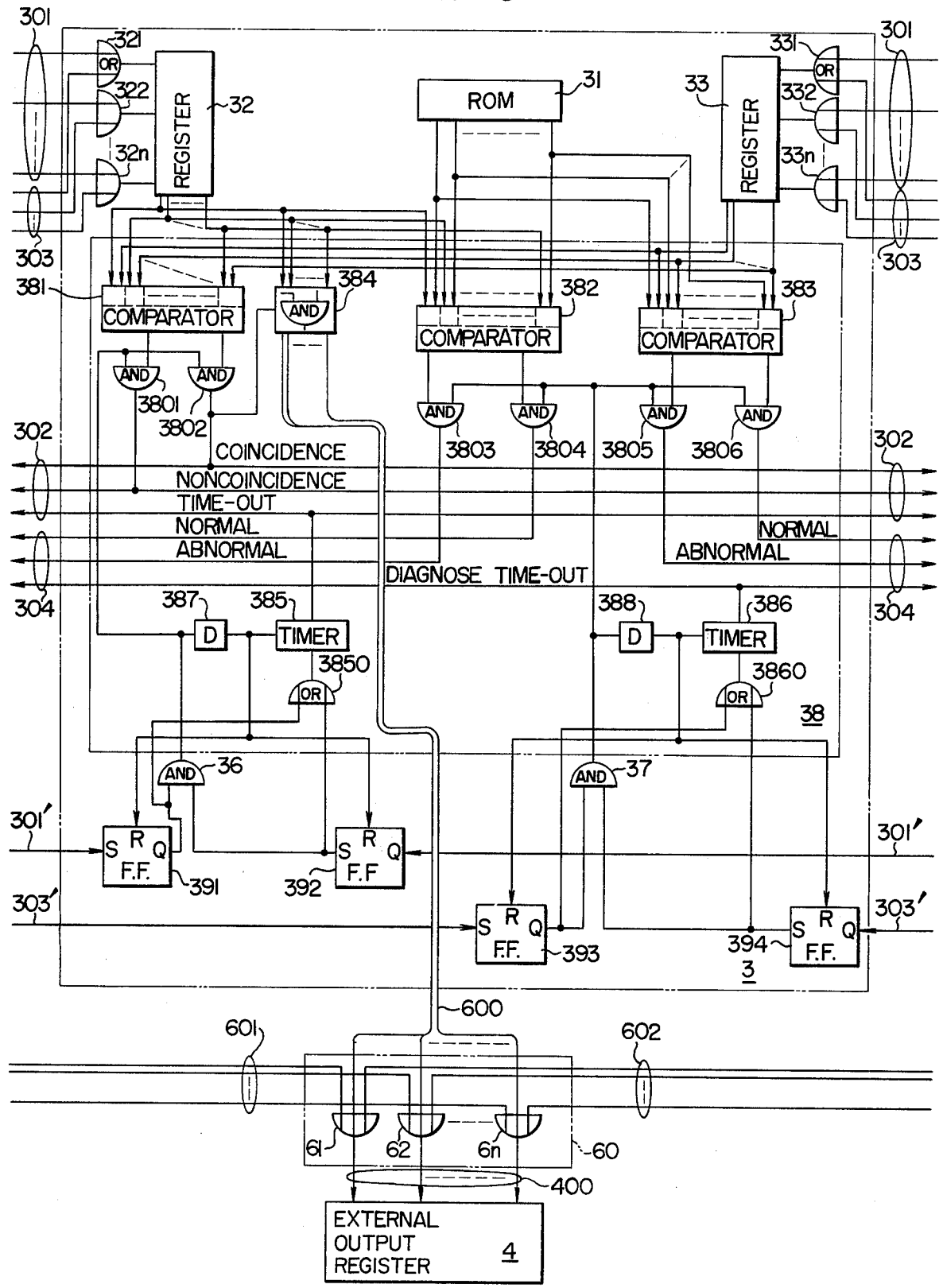
FIG. 5 shows in detail the internal structure of the dual system controller 3 and OR circuit 60 shown in FIG. 1.

FIG. 5 shows in detail the structure of the dual system controller 3 and OR circuit 60. A memory 31 in the dual system controller 3 stores a constant corresponding to the correct results of checking with a diagonose routine. In FIG. 5, this memory 31 is a read-only memory (ROM). A pair of registers 32 and 33 are provided for registering control data signals 303 applied from the respective computer systems 1 and 2. The dual system controller 3 includes AND gates 36 and 37, a decision circuit 38, OR gates 321 to 32n and 331 to 33n, and flip-flops 391 to 394. The decision circuit 38 includes comparators 381 to 383 which make bitwise comparison between two information inputs thereby delivering a coincidence signal and a non-coincidence signal respectively when all the bits of the information inputs coincide with each other and when anyone of the bits of one information input does not coincide with the corresponding one of the other. The control data input 301 passes through an AND gate 384 to be applied to the OR circuit 60 as the control data output 600 when a coincidence signal appears from the comparator 381. A timer 385 applies a time-out signal to the computer systems, 1 and 2 when a control data output timing signal 301' does not appear from one of the computer systems within a predetermined period of time after the appearance of a control data output timing signal 301' from the other computer system. Another timer 386 applies a diagnose time-out signal to the computer systems 1 and 2 when a diagnostic data output timing signal 303' does not appear from one of the computer systems within a predetermined period of time after the appearance of a diagnostic data output timing signal 303' from the other computer system. The decision circuit 38 further comprises AND gates 3801 to 3806, delay means 387 and 388, and OR gates 3850 and 3860. The OR circuit 60 comprises a plurality of OR gates 61 to 6n.

The operation of the dual computer system according to the present invention will now be described in detail with reference to FIGS. 1 to 5 and also to the flow charts of FIGS. 6 to 10. Inasmuch as the computer systems 1 and 2 operate in entirely the same manner, the operation of the comuter system 1 will be chiefly described. FIG. 11 shows memory areas and data stored in the memory areas to carry out various steps according to the flow charts of FIGS. 6 to 10.

Figure 6:
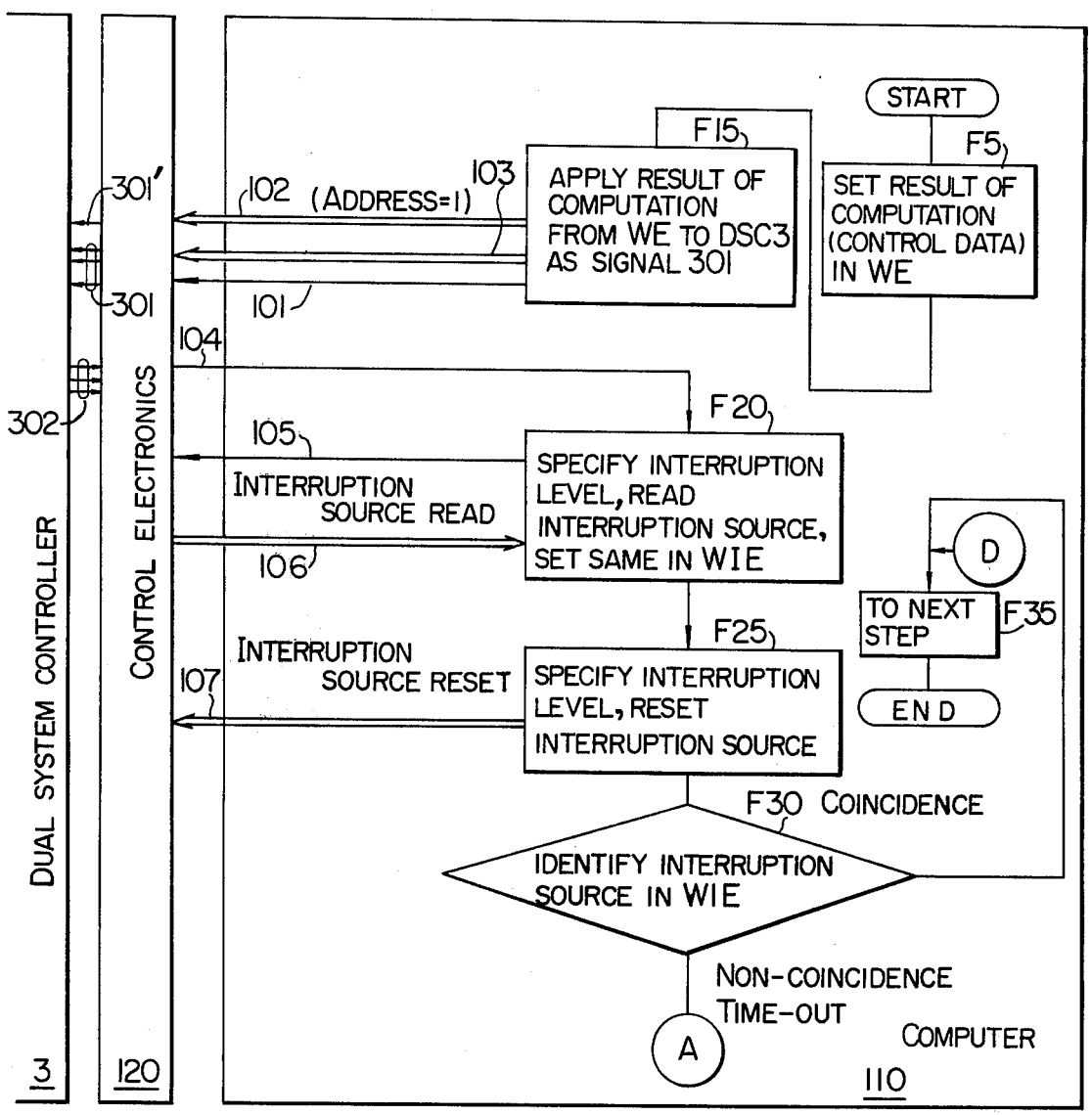
FIGS. 6 to 9 are flow charts illustrating various operations carried out in the computers shown in FIG. 1.

Referring to FIG. 6, control data used for the control of an industrial process or the like are computed by the computer 110, and the result of this computation is stored temporarily in the computer 110. In this case, the result of computation is stored in a memory area WE in FIG. 11. Subsequently, the computer 110 reads the control data stored in the memory area WE and applies a data signal 103 to the control electronics 120 together with a timing signal 101 and an address signal 102 so as to apply the control data stored in the memory area WE to the dual system controller 3. These operating step are represented by F5 and F15 in FIG. 6. In the dual system controller 3 shown in FIG. 3, the address signal 102 is registered in the register 1201 and is then decoded by the decoder 1202, and the address 1 is selected. As a result, an output signal appears from the AND gate 1210, and the control data signal 103 registered in the register 1203 is applied through the AND gates 1211 to 121n to the register 1204 to be registered therein. The control data information registered in the register 1204 is then applied as a control data signal 301 to the register 32 through the OR gates 321 to 32n to be registered in the register 32 in the dual system controller 3. At the same time, a control data output timing signal 301' is applied from the control electronics 120 to the dual system controller 3 to set the flip-flop 391. Similar operation is also carried out in the other computer system 2, and a control data signal 301 is also applied to the register 33 in the dual system controller 3. It will thus be seen in FIG. 5 that the control data signal 301 applied from the computer system 1 is registered in the register 32 and the flip-flop 391 is set by the control data output timing signal 301', while the control data signal 301 applied from the computer system 2 is registered in the register 33 and the flip-flop 392 is set by the control data output timing signal 301'. When the flip-flop 391 is then set earlier than the flip-flop 392, the timer 385 starts to operate by being energized by the Q-output of the flip-flop 391 applied through the OR gate 3850. Then, when the flip-flop 392 is set, an output signal appears from the AND gate 36.

The comparator 381 compares the control data 301 registered in the register 33 with the control data 301 registered already in the register 32. When the content of the register 33 coincides completely with the content of the register 32, a coincidence signal is applied to the AND gate 3802 from the comparator 381, while when they do not coincide with each other, a non-coincidence signal is applied to the AND gate 3801 from the comparator 381. Thus, a coincidence signal and a non-coincidence signal are applied to the computer systems 1 and 2 through the AND gates 3802 and 3801 when the control data 301 applied to the dual system controller 3 from the computer systems 1 and 2 coincide and do not coincide with each other respectively. A reset signal appears from the delay means 387 with a slight time delay after the appearance of the output from the AND gate 36. The flip-flops 391 and 392 and the timer 385 are reset by this reset signal. When this reset signal is not applied to the timer 385 within a predetermined period of time, the timer 385 applies a time-out signal to the computer systems 1 and 2. The delay means 387 acts to provide a sufficient pulse width for the output of the AND gate 36.

The coincidence signal, non-coincidence signal or time-out signal illustrated as a signal 302 in FIG. 5 is applied from the dual system controller 33 to the control electronics 120 in the computer system 1 to be registered in the corresponding flip-flop of the register 1263 in the control electronics 120. As will be apparent in FIG. 4, the coincidence signal, non-coincidence signal or time-out signal 302 registered in the corresponding flip-flop of the register 1263 is applied through the OR gate 1262 to the differentiator 1261 to set the flip-flop 1260. As a result, an interruption request signal 104 is applied from the control electronics 120 to the computer 110. In response to the application of this signal 104, the computer 110 applies an interruption source identifying signal 105 to the control electronics 120. This signal 105 is decoded by the decoder 1264 for turning on one of the AND gates 1271 to 1276. Consequently, the content of the register 1263, that is, the coincidence signal, non-coincidence signal or time-out signal 302, is applied through the corresponding AND gate to the computer 110 as an interruption source representing signal 106 to be set in a memory area WIE of the internal memory. This operation is represented by the step F20 in FIG. 6.

Then, the computer 110 applies an interruption source resetting signal 107 to the control electronics 120. This signal 107 is applied to one of the AND gates 1281 to 1286 to reset the corresponding flip-flop of the register 1263. This operation is represented by the step F25 in FIG. 6. The computer 110 checks the interruption source stored in the memory area WIE to confirm the character of the interruption source stored in the memory area WIE. This operation is represented by the step F30 in FIG. 6. When the interruption source stored in the memory area WIE is confirmed to be coincidence, the computer 110 continues to operate to compute the next control data to apply the same to the dual system controller 3. Thus, when the dual computer system is operating free from any abnormality, control data is continuously applied to the external output register 4 while repeating the steps above described.

Figure 7:
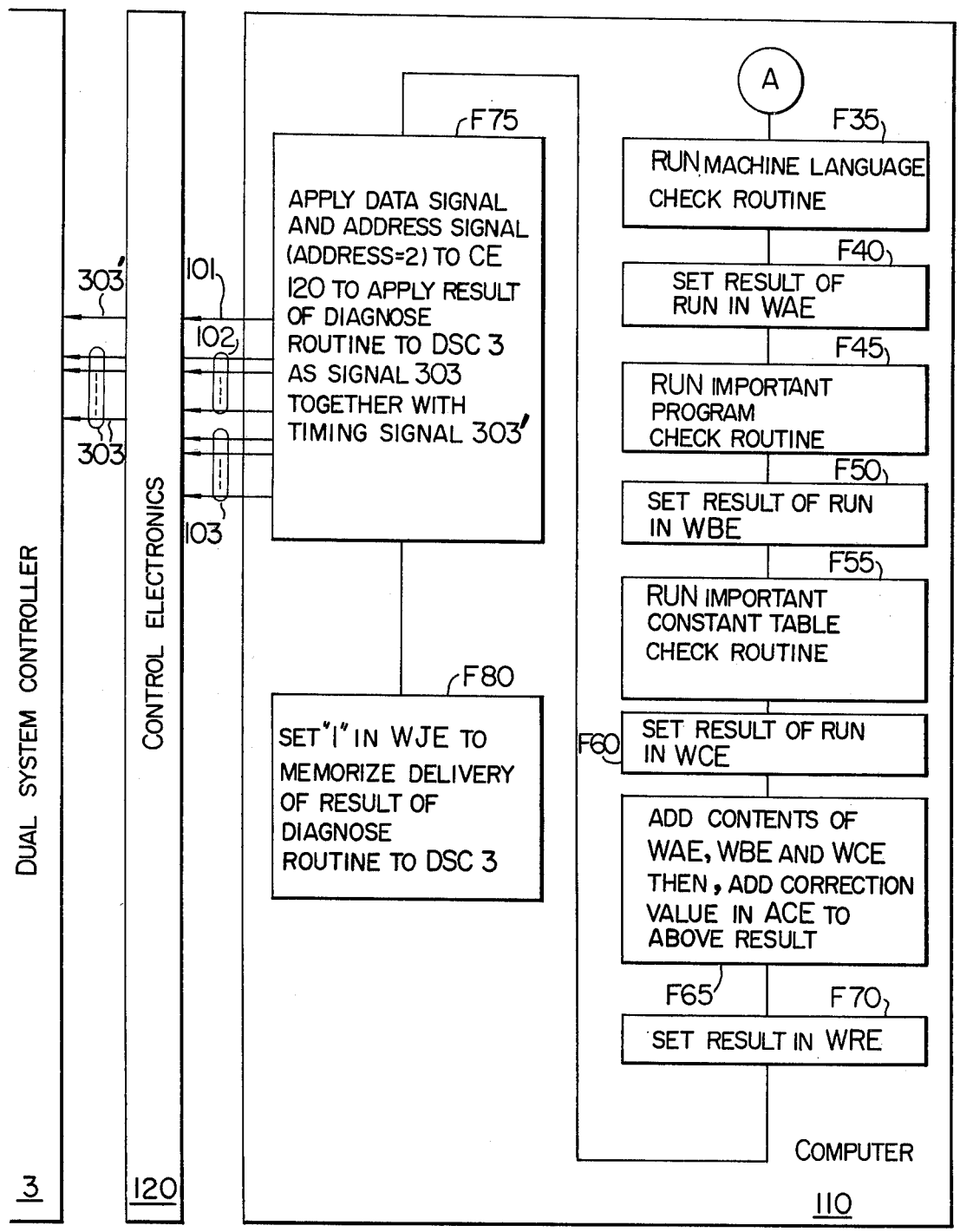

When a non-coincidence or time-out is detected as a result of the interruption source detection step F30 in FIG. 6, step F30 is followed by the step F35 in FIG. 7 since an abnormal situation somewhere in the dual computer system has occurred. A diagnose routine is run as shown by the steps F35 to F70 in FIG. 7. An example of such a diagnose routine is shown in FIG. 10. In FIG. 10a showing various checking routines, the machine language checking routine is only shown in detail in the form of assembler languages. It is apparent however that the important program checking routine and important constant table checking routines can also be realized in entirely the same manner. FIG. 10b shows an example of memory area and data used for running the diagnose routine. This diagnose routine is featured by the fact that the machine languages, important programs and important constant table stored in the memory area are all regarded as numbers and suitable arithmetic operations are carried out on these numbers so as to finally obtain a constant. In FIG. 7, the result of checking with the diagnose routine is finally stored in a memory ara WRE as shown in the step F70.

The data signal 103 representing the result stored in the memory area WRE is applied together with the timing signal 101 and address signal 102 to the control electronics 120 to be applied to the dual system controller 3. At the same time, the fact that the result of checking with the diagnose routine has been applied to the dual system controller 3 is stored in a memory area WJE. In the control electronics 120, the data signal 103 representing the result of checking with the diagnose routine is registered in the register 1203, and the address signal 102 is registered in the register 1201. The address 2 is selected by the decoder 1202 connected to the register 1201, and a gate signal is applied to the AND gate 1220 to which the timing signal 101 is also applied. Therefore, a diagnostic data output timing signal 303' is applied from the AND gate 1220 to the dual system controller 3. This timing signal 303' is also applied to the AND gates 1221 to 122n to turn on the same. The content of the register 1203 is applied through the AND gates 1221 to 122n to the register 1205 to be registered therein. Consequently, the result of checking with the diagnose routine is applied as a signal 303 to the dual system controller 303. In the dual system controller 3 shown in FIG. 5, the signal 303 is applied through the OR gates 321 to 32n to the register 32 to be registered therein. A signal 303 is similarly applied from the other computer system 2 to be registered in the register 33 through the OR gates 332 to 33n. The timing signals 303' are applied to the respective flip-flops 393 and 394 to set the same.

Suppose now that the signal 303 and timing signal 303' are applied to the dual system controller 3 from the computer system 1 earlier than those applied from the other computer system 2. In the dual system controller 3, the flip-flop 393 is set by the timing signal 303', and at the same time, the signal 303 is registered in the register 32. The Q-output of the flip-flop 393 is applied to one of the input terminals of the AND gate 37 and to the timer 386 through the OR gate 3860 to actuate the timer 386. The comparator 382 compares the result of checking with the diagnose routine registered in the register 32 with the correct result (the correct answer) of checking with the diagnose routine obtained in the normal operating state of the dual computer system and stored previously in the memory 31. A coincidence signal appears from the comparator 382 to be applied to the AND gate 3804 when there is coincidence therebetween. A non-coincidence signal appears from the comparator 382 to be applied to the AND gate 3803 when there is non-coincidence therebetween.

Then, when the signal 303 and timing signal 303' are applied to the dual system controller 3 from the other computer system 2, the signal 303 is registered in the register 33, and the flip-flop 394 is set by the timing signal 303'. The comparator 383 compares the result of checking with the diagnose routine registered in the register 33 with the correct answer stored in the memory 31. A coincidence signal appears from the comparator 383 to be applied to the AND gate 3806 when there is coincidence therebetween. A non-coincidence signal appears from the comparator 383 to be applied to the AND gate 3805 when there is non-coincidence therebetween. Since the flip-flop 394 is set by the timing signal 303', an output signal appears from the AND gate 37 to be applied to the AND gates 3803 to 3806. In response to the application of this gate signal, the AND gate 3803 or 3804 applies a normal signal or an abnormal signal to the computer system 1, and the AND gate 3805 or 3806 applies a normal signal or an abnormal signal to the computer system 2. The timer 386 is reset with a suitable delay time after the appearance of the output from the AND gate 37, and this delay time is determined by the delay means 388. At the same time, the flip-flops 393 and 394 are also reset. The delay means 388 acts to provide a sufficient pulse width for the output of the AND gate 37. The timer 386 applies a diagnose time-out signal to the computer systems 1 and 2 when the reset signal is not applied thereto within a predetermined period of time after it has been set.

In this manner, the normal signal, abnormal signal or diagnose time-out signal is applied as a signal 304 from the dual system controller 3 to the control electronics 120 and 220 to be registered temporarily in the corresponding flip-flops of the registers therein. Referring to FIG. 4, this signal 304 is registered in the corresponding flip-flop of the register 1263 in the control electronics 120. An output signal appears from the OR gate 1262 and is applied to the differentiator 1261 to set the flip-flop 1260, and an interruption request signal 104 appears from the flip-flop 1260. In response to the application of this signal 104, the computer 110 applies an interruption source identifying signal 105 to the control electronics 120. This operation of the computer 110 is represented by the step F85 in FIG. 8. In response to the application of the signal 105 to the control electronics 120 from the computer 110, one of the AND gates 1271 to 1276 is turned on, and the content of the register 1263 is applied as a signal 106 to the computer 110 as shown in FIG. 4. The signal 106 representing the interruption source (which is, in this case, either the normal signal or the abnormal signal or the diagnose time-out signal) is set in the memory area WIE in the computer 110 as shown in the step F85 in FIG. 8. Subsequently, the computer 110 applies an interruption source resetting signal 107 and a data signal 105 to the control electronics 120. The signal 107 is applied to one of the AND gates 1281 to 1286 for resetting the corresponding flip-flop of the register 1263. This operation is represented by the step F90 in FIG. 8. After the register 1263 in the control electronics 120 has been reset, the computer 110 checks to identify the interruption source stored previously in the memory area WIE, which is either the normal signal or the abnormal signal or the diagnose time-out signal. This operation is represented by the step F95 in FIG. 8. When the result of identification in the step F95 proves that the computer system 1 is abnormal, signals 101, 102 and 103 are applied from the computer 110 to the control electronics 120 so that a shut-down signal 501 for shutting down the computer system 1 can be applied from the control electronics 120 to the status register 5. In this case, the address 5 in the conrol electronics 120 is selected by the address signal 102.

Referring to FIG. 3, in response to the application of the signals 101, 102 and 103 to the control electronics 120 from the computer 110 for the purpose of shut-down of the computer system 1, the decoder 1202 selects the address 5 and applies an output signal to the AND gate 1250. As a result, the data signal 103 registered temporarily in the register 1203 is applied through the AND gates 1251 to 125n to the decoder 1208. Translating that the data signal 103 applied to the control electronics 120 dictates shut-down of the computer system 1, the decoder 1208 applies a shut-down signal 501 to the status register 5. Referring to FIG. 2, the signal 501 is applied to the flip-flop 6 in the status register 5 to set the same. (The flip-flop 7 is set when a shut-down signal 501 appears similarly from the other computer system 2.) Thus, the shut-down of the computer system 1 is identified by the setting of the flip-flop 6 in the status register 5. As shown in the step F100 in FIG. 8, the computer system 1 is immediately shut down in response to the appearance of the sut-down signal 501 dictating shut-down of the computer system 1.

Figure 8:
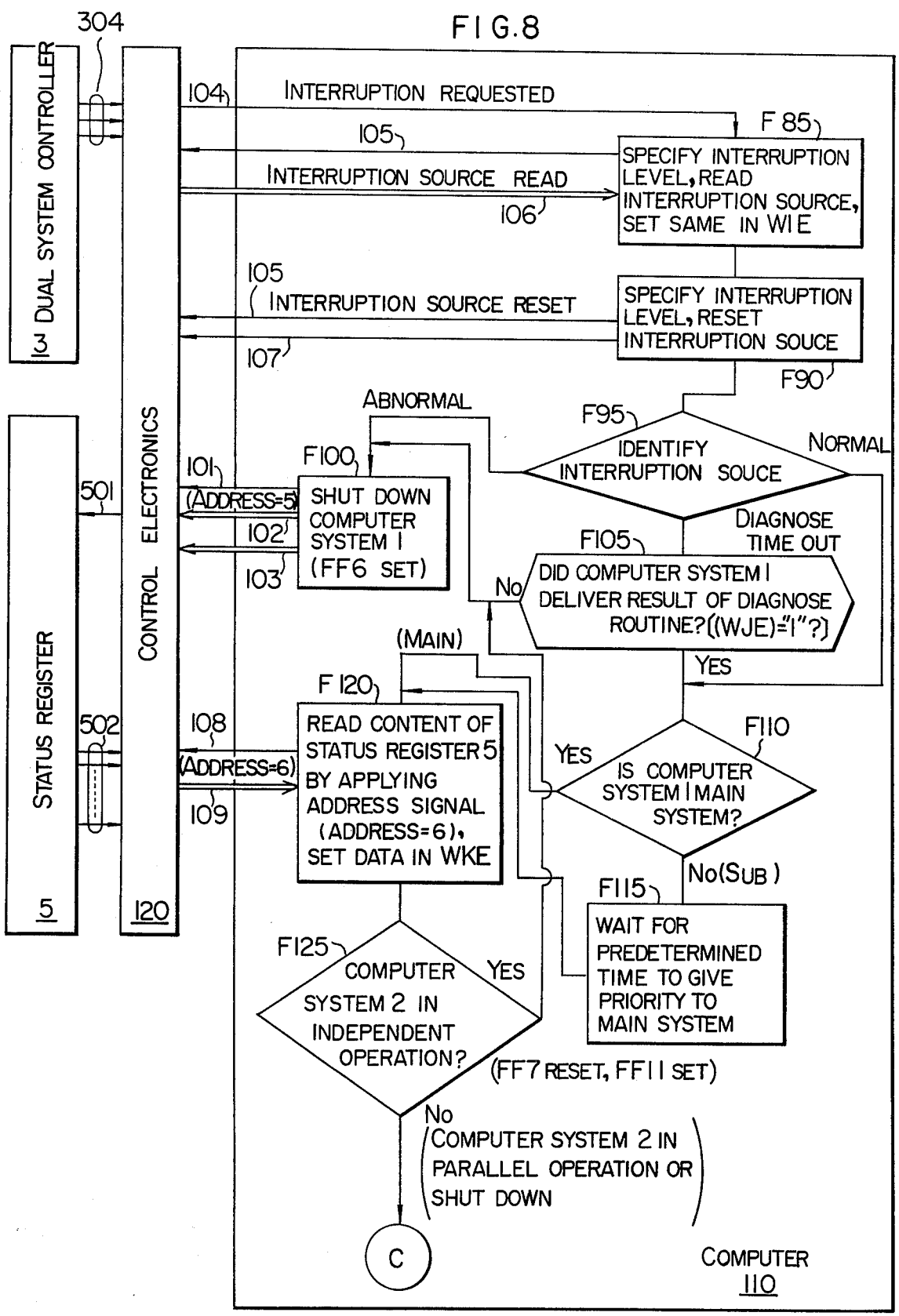

The step F95 is followed by the step F110 in FIG. 8 when the result of identification proves that the computer system 1 is normal. In the step F110, decision is made as to whether the computer system 1 is the main system or not. The computer system 1 is identified to be the main system and the subsidiary system when the content of the memory area WJE is a 1 and a 0 respectively, due to the fact that a 1 is set in this memory area WJE in response to the appearance of a changing-over command 503 from either of the computer systems 1 and 2. The step F110 is immediately followed by the step F120 in FIG. 8 when the computer system 1 is proved to be the main system. When the computer system 1 is the subsidiary system, it waits for a predetermined period of time since the other computer system 2 has the priority. This step is represented by F115 in FIG. 8.

In the step F120, an address signal 108 is applied to the control electronics 120 from the computer 110 to read the content of the status register 5. Referring to FIG. 4, this address signal 108 is applied to the decoder 1266 through the register 1265 in the control electronics 120, and the address 6 is selected by the decoder 1266. A gate signal is applied to one input terminal of the AND gates 1291 to 1296, and the content 502 of the status register 5 is applied as a signal 109 to the computer 110. This signal 109 is stored in a memory area WKE in the computer 110. Then, on the basis of the status of the status register 5 stored in the memory area WKE, decision is made in the step F125 as to whether the operating mode of the other computer system 2 is changed over to independent operation, and the step F125 is followed by the step F100 when such change-over has occurred already. However, the steps shown in FIG. 9 take place when the operating mode of the computer system 2 has not yet been changed over to independent operation.

Figure 9:
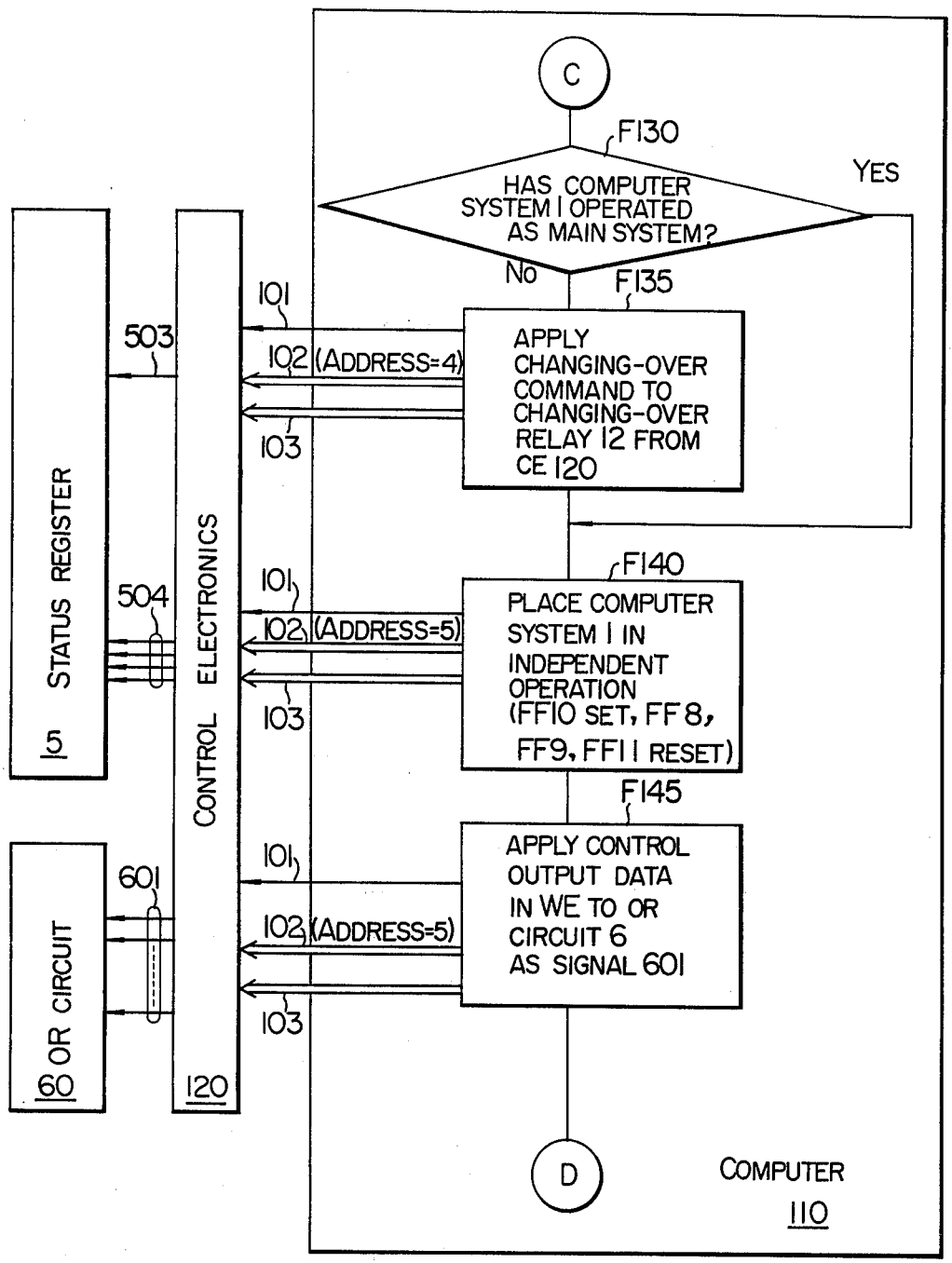

In the step F130 in FIG. 9, decision is made as to whether the computer system 1 is the main system or subsidiary system. When the result proves that the computer system 1 is the main system, the step F130 is followed directly by the step F140, while when the computer system 1 is proved to be the subsidiary system, the step F130 is followed by the step F135 and then by the step F140. In the step F135, the signals 101, 102 and 103 are applied from the computer 110 to the control electronics 120 so that the changing-over command 503 can be applied from the control electronics 120 to the status register 5. In this case, the address signal 102 is used to select the address 4. Referring to FIG. 3, the decoder 1202 in the control electronics 120 selects the address 4 in response to the application of the address signal 102 through the register 1201, and the output thereof is applied to one of the input terminals of the AND gate 1240. The AND gates 1241 to 124n are turned on to apply the content of the register 1203 to the decoder 1207. The decoder 1207 translates the data registered in the register 1203 and applies the changing-over command 503 to the status register 5.

Referring to FIG. 2, the changing-over command 503 is applied to the changing-over relay 12 in the status register 5, and the changing-over switches 13 to 16 are changed over to the position connected to the computer system 1 from which the changing-over command 503 is applied to the status register 5. In the step F140 in FIG. 9, the operating mode of the computer system 1 is changed over to independent operation. To this end, the signals 101, 102 and 103 are applied from the computer 110 to the control electronics 120 so as to set the status register 5 in the status which displays independent operation of the computer system 1. Referring to FIG. 3, the address signal 102 is applied through the register 1201 to the decoder 1202 in the control electronics 120 to select the address 5. Therefore, an output signal appears from the AND gate 1250 to turn on the AND gates 1251 to 125n. The data signal 103 registered in the register 1203 is thus applied through the AND gates 1251 to 125n to the decoder 1208, and an output signal 504 is applied from the decoder 1208 to the status register 5 to set the status in which the computer system 1 is placed in independent operation. Since, in this case, the computer system 1 is placed in independent operation, this signal 504 acts to set the flip-flop 10 in FIG. 2.

The step F140 in FIG. 9 is then followed by the step F145 after the computer system 1 has been placed in independent operation. Since, in this step F145, the operating mode of the computer system 1 has already been changed over to independent operation, the signals 101, 102 and 103 are applied from the computer 110 to the control electronics 120 so that the control data computed and stored in the memory area WE can be applied to the OR circuit 60. Referring to FIG. 3, the address 3 is selected by the decoder 1202 in response to the application of the address signal 102 through the register 1201 in the control electronics 120, and an output signal appears from the AND gate 1230. Therefore, the data signal 103 registered in the register 1203 is applied through the AND gates 1231 to 123n to the register 1206 to be registered therein, and an output signal 601 appears from the register 1206 to be applied to the OR circuit 60. Thereafter, similar operation is repeated starting from the step F35 in FIG. 6, and control data are continuously computed. The signal 601 is continuously applied to the OR circuit 60 for the control of an industrial process or the like by the control data registered in the external output register 4 until the computer system 1 is released from the status of independent operation.

It will be understood from the foregoing detailed description of the present invention that one of the computer systems is isolated from the other to prevent the computer systems from arbitrary delivering their outputs in the event of occurrence of an abnormal situation in the other computer system or in the dual system controller, thereby ensuring a very stable operation of the dual computer system.

We claim:

1. A dual computer system comprising a main computer system having means for computing control data to be outputted to an external output register, means for running a diagnose routine stored in an internal memory provided in said main computer system, means for changing over the operation mode of said main computer system from a parallel operation mode to either an independent operation mode or a shut-down mode; a subsidiary computer system having means for computing control data to be outputted to said external output register, means for running a diagnose routine stored in another internal memory provided in said subsidiary computer system, and means for changing over the operation mode of said subsidiary computer system from a parallel operation mode into either an independent operation mode or a shut-down mode; first memory means connected to an output of said main computer system for storing the result of an operation performed by said main computer system; second memory means connected to an output of said subsidiary computer system for storing the result of an operation performed by said subsidiary computer system; first comparing means for comparing the content of said first memory means with that of said second memory means and for providing an output signal to initiate the outputting of the content of either of said first and second memory means when coincidence therebetween is detected, and for providing another output signal to initiate the running of the diagnose routine through each of said main and subsidiary computer systems when non-coincidence therebetween is detected; third memory means for storing predetermined information for determining whether or not said main and subsidiary computer systems are functioning correctly by using said predetermined information as a reference for comparison with the respective information stored in said first and second memory means, said information stored in said first and second memory means representing the respective outputs of the main and subsidary computer systems when said computer systems have performed the diagnose routine; second comparing means for comparing the content of said third memory means with the result of checking with the diagnose routine run through said main computer system thereby providing an output signal for immediately placing said main computer system in independent operation when coincidence therebetween is detected, and providing another output signal to instruct shut-down of said main computer system when non-coincidence therebetween is detected; status register means connected to said main and subsidiary computer systems for storing either a first or second output signal from said main computer system for indicating when said main computer system is operating in the independent operation mode or shut-down mode respectively; and third comparing means for comparing the content of said third memory means with the result of checking with the diagnose routine run through said subsidiary computer system thereby providing an output signal to instruct said subsidiary computer system to read the content of said status register means when coincidence therebetween is detected and to place said subsidiary computer system in independent operation only when shut-down of said main computer system is registered in said status register means, and providing another output signal to instruct shut-down of said subsidiary computer system when non-coincidence therebetween is detected.

2. A dual computer system as claimed in claim 1, wherein said status register means comprises changing-over switch means, having as its actuating input signal a change-over command signal produced by said subsidiary computer system, said changing-over switching means changing-over the interconnection between said status register means and said respective main and subsidiary computer systems; each of said main and subsidiary computer systems including means for producing change-over command signals, said changing-over command signal producing means of said subsidiary computer system being adapted to produce the changing-over command signal when it is manually actuated so as to interchange the roles in parallel operation between said main and subsidiary computer systems, and when the content of said first register indicates that said main computer system is in shut-down mode, said changing-over command signal producing means of said subsidiary computer system enabling said subsidiary computer system to operate in an independent operation mode as a main computer system.

3. A dual computer system as claimed in claim 1, wherein said subsidiary computer system reads the content of said status register means in a period of time greater than that required for said main computer system to be placed in independent operation after the output of said third comparing means has been applied to said subsidiary computer system.

4. A dual computer system as claimed in claim 1, wherein a first timer means is provided for applying a time-out signal to said main and subsidiary computer systems to initiate the running of the diagnose routine therethrough when the result of the operation carried out by one of said computer systems does not appear within the period of time required for this operation, said time-out signal being provided even after the appearance of the result of the operation by the other said computer system with both said main and subsidiary computer systems having carried out the same operation.

5. A dual computer system as claimed in claim 1, wherein a second timer means is provided for applying a diagnose time-out signal to said main and subsidiary computer systems when the result of checking with the diagnose routine does not appear from one of said computer systems within the period of time required for this checking, said diagnose time-out signal being provided even after the appearance of the result of checking from the other said computer system with the same diagnose routine having been run through said main and subsidiary computer systems.

6. A dual computer system as claimed in claim 5, wherein, in response to the application of the diagnose time-out signal, each of said computer systems determines whether or not the result of checking with the diagnose routine has been delivered therefrom and shuts itself down when the result has not been delivered therefrom, while when the result has been delivered from each of said computer systems, the computer system operating as the main computer system is immediately placed in independent operation, while the computer system operating as the subsidiary computer system is placed in independent operation only after a reading of the content of said status register means indicates that said main computer system has been shut down.

* * * * *